United States Patent
Nakagawa (10) Patent No.: US 8,102,309 B2
(45) Date of Patent: Jan. 24, 2012

(54) RADAR DEVICE

(75) Inventor: Kado Nakagawa, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 282 days.

(21) Appl. No.: 12/428,736

(22) Filed: Apr. 23, 2009

(65) Prior Publication Data

US 2010/0134343 A1    Jun. 3, 2010

(30) Foreign Application Priority Data

Dec. 1, 2008  (JP) ................. 2008-306667

(51) Int. Cl.
*G01S 13/00* (2006.01)
(52) U.S. Cl. .................. 342/147; 342/189; 342/192
(58) Field of Classification Search ........... 342/147–158
See application file for complete search history.

(56) References Cited

U.S. PATENT DOCUMENTS

2009/0040097 A1 * 2/2009 Sakamoto et al. ............ 342/118
2009/0096661 A1 * 4/2009 Sakamoto ...................... 342/92

FOREIGN PATENT DOCUMENTS

| JP | 06-331731 A | 12/1994 |
|---|---|---|
| JP | 2006-145251 A | 6/2006 |
| JP | 2006-234483 A | 9/2006 |
| JP | 2007-240313 A | 9/2007 |
| JP | 2008-014956 A | 1/2008 |
| JP | 2008-249373 A | 10/2008 |

OTHER PUBLICATIONS

Ralph O. Schmidt, "Multiple Emitter Location and Signal Parameter Estimation," IEEE Transactions on Antennas and Propagation, Mar. 1986, pp. 276 to 280, vol. AP-34, No. 3.

* cited by examiner

*Primary Examiner* — Timothy A Brainard
(74) *Attorney, Agent, or Firm* — Sughrue Mion, PLLC (57) ABSTRACT

Provided is a radar device capable of accurately calculating directions and the number of targets. A direction calculation unit includes a correlation matrix addition prohibition unit that prohibits, when a peak frequency in a plurality of modulation periods of a target is in the vicinity of 0, addition of a correlation matrix generated from a peak frequency spectrum having the peak frequency in the vicinity of 0, and calculates the direction of the target on the basis of a summed correlation matrix in which correlation matrices generated from peak frequency spectra having peak frequencies out of the vicinity of 0.

11 Claims, 10 Drawing Sheets

RADAR DEVICE

BACKGROUND OF THE INVENTION

1. Field of the Invention

The present invention relates to a radar device that calculates target information on the basis of a reflected signal when a transmitting signal (electric wave) is emitted to a target object (hereinafter, referred to as "target"), and the reflected signal based on the transmitting signal from the target is received by a plurality of receiving antennas.

2. Description of the Related Art

Up to now, as a radar device for calculating a distance to a target or a relative velocity thereto, there has been known a frequency modulated radar device that transmits a transmitting signal having a successively modulated frequency to the target, and receives a reflected signal from the target to calculate a distance to the target and a relative velocity thereto.

As a method of calculating a target direction in the radar device of this type, there has been known a method of calculating a direction of the target by mechanically rotating transmitting means to scan the transmitting signal. Further, there has been known a super-resolution arrival direction estimating process such as a multiple signal classification (MUSIC) method that calculates a direction of the target by outputting a transmitting signal without mechanically rotating the transmitting means and subjecting a received signal that has been received by an array antenna having a plurality of channels to digital signal processing (for example, refer to R. O. Schmidt, "Multiple Emitter Location and Signal Parameter Estimation," IEEE Trans. Vol. AP-34, No. 3, March 1986, pp. 276 to 280).

In the MUSIC method, a correlation matrix of a peak frequency spectrum is computed, the correlation matrix is subjected to eigendecomposition, an angle spectrum is computed from an eigenvector, and a direction of the target is calculated according to the angle spectrum.

The super-resolution arrival direction estimating process represented by the above-mentioned MUSIC method cannot be applied as it is to a land mobile communication or the like which is very high in correlations among incoming waves because the process assumes that the respective incoming waves is uncorrelated with each other. In general, in order to suppress the correlations among the incoming waves, it is desirable to increase the number of received signals (number of snapshots) used for generation of the correlation matrix.

Under the above-mentioned circumstances, in the general radar device, the correlation matrix is obtained for each measurement, and hence there is used a temporal averaging method in which a plurality of the correlation matrixes are added together to ensure the number of snap shots. More specifically, the direction of the target is calculated on the basis of a summed correlation matrix in which a correlation matrix generated from an up-period peak frequency spectrum and a correlation matrix generated from a down-period peak frequency spectrum are added together.

However, in the case where at least one of the up-period peak frequency and the down-period peak frequency falls within a given frequency range, when the correlation matrix generated from the peak frequency spectrum having a peak frequency within the given frequency range is added to the correlation matrix generated from the peak frequency spectrum having a peak frequency outside of the given frequency range, there arises such a problem that the direction of the target cannot be accurately calculated, or the number of targets is miscalculated.

This is because, when noises generated in a transceiver or an A/D converter, an offset voltage caused by the variation or the temperature characteristics, a reflected signal from a stopping target, or the like is superimposed on the received signal, and the superimposed signal is analyzed in frequency, the frequency is reflected on a portion within the given frequency range. Accordingly, the addition of the correlation matrix generated from the frequency spectrum having a frequency within the given frequency range disenables the direction of the target to be accurately calculated, or causes the number of targets to be miscalculated.

Further, when a plurality of targets exist, a number of up-period peak frequencies and down-period peak frequencies corresponding to the number of targets appear. In order to calculate distances R among the respective targets and relative velocities V, it is necessary to combine the up-period peak frequency fbu and the down-period peak frequency fbd together for each target.

However, after the combination has been completed, in the case where any one of an up-period peak frequency fbu_a and a down-period peak frequency fbd_a of a target a overlaps an up-period peak frequency fbu_b and a down-period peak frequency fbd_b of a target b, when a correlation matrix generated from the peak frequency spectrum of the overlapping peak frequency is added to a correlation matrix generated from the peak frequency spectrum of the nonoverlapping peak frequency, there arises such a problem that directions of the targets a and b cannot be accurately calculated, or the numbers of targets a and b are miscalculated.

This is because, in the case where the peak frequencies caused by the plurality of targets having different distances and different relative velocities overlap each other, when phases of the peak frequencies are calculated, phases of the reflection waves due to the plurality of targets are combined together, respectively, whereby the precise correlation matrix cannot be calculated. Accordingly, when the correlation matrix generated from the frequency spectrum of the peak frequencies is added, the direction of the target cannot be accurately calculated, or the number of targets is miscalculated.

SUMMARY OF THE INVENTION

The present invention has been made to solve the above-mentioned problem, and therefore an object of the present invention is to provide a radar device that prohibits, when a peak frequency in a plurality of modulation periods satisfies a given condition, addition of a correlation matrix generated from a peak frequency spectrum having the peak frequency which satisfies the given condition, and calculates directions of a target on the basis of correlation matrices generated from peak frequency spectra having peak frequencies in the plurality of modulation periods, which do not satisfy the given condition, thereby enabling the directions and number of targets to be accurately calculated.

Further, a second object of the present invention is to provide a radar device that prohibits, when a peak frequency of a plurality of targets in a plurality of modulation periods satisfies a given condition, addition of a correlation matrix generated from a peak frequency spectrum having the peak frequency which satisfies the given condition, and calculates the directions of targets on the basis of the correlation matrices generated from the peak frequency spectra having peak frequencies of the plurality of targets in the plurality of modulation periods, which do not satisfy the given condition, thereby enabling the directions and number of targets to be accurately calculated.

A radar device according to the present invention includes: transmitting means for transmitting a transmitting signal having a plurality of modulation periods; receiving means for receiving a reflection signal, resulting from reflection of the transmitting signal by a target, by a plurality of antennas; mixing means for mixing the transmitting signal and each of a plurality of received signals received by the receiving means together to obtain a plurality of beat signals; frequency analyzing means for analyzing each of the plurality of beat signals in frequency; and a target detection unit that calculates a direction of the target based on a summed correlation matrix in which correlation matrices generated from peak frequency spectra having peak frequencies in the plurality of modulation periods that do not satisfy a given condition are added together, according to a plurality of frequency analyzing results obtained by the analyzing of the frequency analyzing means, in which the target detection unit includes a correlation matrix addition prohibition unit that prohibits addition of a correlation matrix generated from a peak frequency spectrum having the peak frequency that satisfies the given condition, when a peak frequency in the plurality of modulation periods satisfies the given condition.

In the radar device according to the present invention, there is added no correlation matrix generated from the peak frequency spectrum having the peak frequency within the given frequency range, in which noises generated by a transceiver or an A/D converter, an offset voltage caused by the variation or the temperature characteristics, a reflection signal from a stopping target, or the like is superimposed on the received signal, and hence the directions and the number of targets can be accurately calculated. In addition, when the peak frequencies caused by the plurality of targets having different distances and different relative velocities overlap each other, the correlation matrix generated from the peak frequency spectra of those peak frequencies is not added, and hence the directions and the number of targets can be accurately calculated.

BRIEF DESCRIPTION OF THE DRAWINGS

In the accompanying drawings.

DETAILED DESCRIPTION OF THE PREFERRED EMBODIMENTS

First Embodiment

Figure 1:
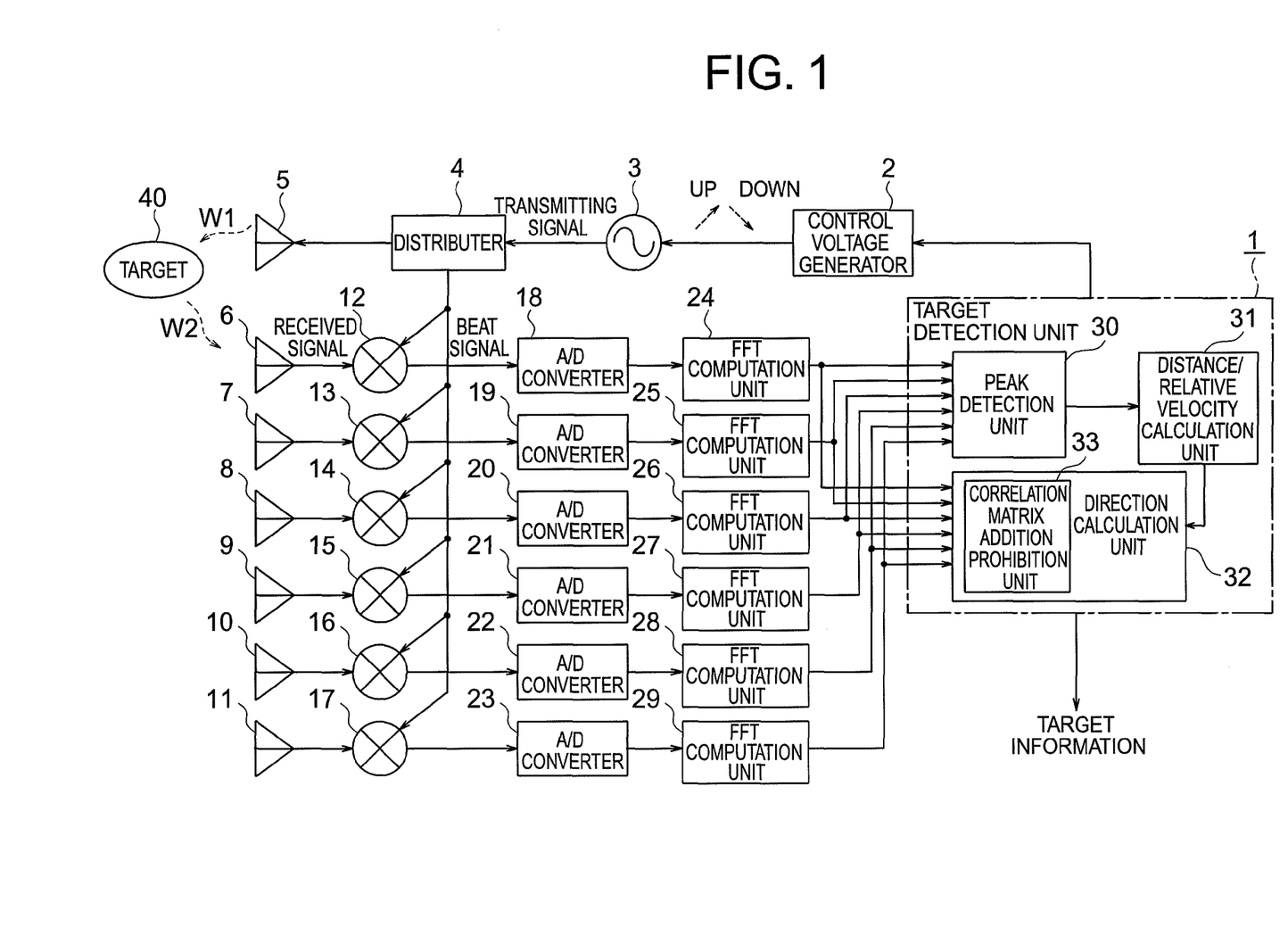
FIG. 1 is a diagram illustrating a configuration of a radar device according to a first embodiment of the present invention.

A radar device according to a first embodiment of the present invention is described with reference to FIGS. 1 to 5. FIG. 1 is a diagram illustrating a configuration of the radar device according to the first embodiment of the present invention. In the following description, the same symbols indicate identical or corresponding parts in the respective drawings.

Referring to FIG. 1, the radar device according to the first embodiment of the present invention includes: a target detection unit 1 made up of a microcomputer; a control voltage generator 2 that outputs a control voltage under control of the target detection unit 1; a voltage controlled oscillator (VCO) 3 that outputs a transmitting signal having a frequency modulated in up/down on the basis of the control voltage; a distributer 4 that distributes a transmitting signal; and a transmitting antenna 5 (transmitting means) that emits a transmitting signal W1 to a target 40.

Referring to FIG. 1, the radar device also includes: array receiving antennas 6 to 11 (receiving means) made up of a plurality of channels (for example, six channels) which receive a reflection signal W2 resulting from reflection of a transmitting signal W1 by the target 40; mixers 12 to 17 (mixing means) that mix the transmitting signals distributed by the distributer 4 with the received signals for the plurality of channels, respectively, to obtain beat signals for the plurality of channels; A/D converters 18 to 23 that subject the beat signals for the plurality of channels to A/D conversion; and fast Fourier transform (FFT) computation units 24 to 29 (frequency analyzing means) that frequency-analyze the A/D converted beat signals for the plurality of channels, respectively.

The frequency analysis results of the beat signals for the plurality of channels (beat frequency spectrum for the plurality of channels) from the FFT computation units 24 to 29 are input to the target detection unit 1. The target detection unit 1 calculates a distance to, a relative velocity of, or a direction of the target 40 to output the calculation result to an external device (not shown) as target information.

In order to obtain the target information, the target detection unit 1 includes a peak detection unit 30, a distance/relative velocity calculation unit 31, a direction calculation unit 32, and a correlation matrix addition prohibition unit 33. The peak detection unit 30 detects a peak frequency on the basis of the frequency analysis result of the beat signals. The distance/relative velocity calculation unit 31 calculates a distance R to and a relative velocity V of the target 40 on the basis of the peak frequency. The direction calculation unit 32 calculates a direction θ of the target 40 on the basis of the peak frequency spectra for the plurality of channels, the distance R, and the relative velocity V. The correlation matrix addition prohibition unit 33 prohibits the addition of a correlation matrix generated from the peak frequency spectrum having a peak frequency that satisfies a given condition when the peak frequency of the target satisfies the given condition.

Subsequently, a description is given of the operation of the radar device according to the first embodiment with reference to the accompanying drawings.

First, when a modulation start command is issued from the target detection unit 1 to the control voltage generator 2, the control voltage in a plurality of modulation periods (for example, up/down of a triangular configuration) is applied to the VCO3 from the control voltage generator 2, and a transmitting signal that has been modulated in frequency in an up-period and a down-period according to the control voltage is output from the VCO 3.

The transmitting signal is distributed to the transmitting antenna 5 and the mixers 12 to 17 through the distributer 4, and emitted from the transmitting antenna 5 toward the target 40.

On the other hand, the reflection signal W2 that has been reflected by the target 40 are received by the plurality of (for example, six) receiving antennas 6 to 11 as received signals for six channels (CH1 to CH6), and then mixed with the transmitting signals by the respective mixers 12 to 17.

As a result, the beat signals for six channels are generated from the mixers 12 to 17, and the respective beat signals are converted into digital data by the A/D converters 18 to 23, in an up-period in which the frequency increases with time and a down-period in which the frequency decreases with time, respectively.

The digital data generated from the A/D converters 18 to 23 is subjected to frequency analysis using an FFT by the FFT computation units 24 to 29, respectively. The frequency analysis results (beat frequency spectra) for six channels which have been calculated by the FFT computation units 24 to 29 are input to the target detection unit 1 in the respective up-period and down-period.

Within the target detection unit 1, the peak detection unit 30 first detects the peak frequency according to the frequency analysis results for six channels.

Then, the distance/relative velocity calculation unit 31 calculates the distance and relative velocity of the target 40 according to the peak frequency. In this case, the computation value of an unlikely distance or relative velocity is excluded without being regarded as information on the target 40.

Finally, the direction calculation unit 32 subjects a peak frequency spectrum corresponding to the peak frequency used for calculation of the distance and the relative velocity to a super-resolution arrival direction estimating process, thereby calculating the direction θ of the target 40. In this example, the above-mentioned MUSIC method is employed as the super-resolution arrival direction estimating process.

More specifically, as described later, the direction calculation unit 32 prohibits, on the basis of the frequency analysis results for the plurality of channels, addition of a correlation matrix generated from the peak frequency spectrum having a peak frequency within a given frequency range by means of the correlation matrix addition prohibition unit 33 when an up-period peak frequency and a down-period peak frequency of the target fall within the given frequency. The direction calculation unit 32 calculates the direction or the number of targets 40 according to an eigenvalue and an eigenvector of a correlation matrix generated from a peak frequency spectrum having a peak frequency outside of the given frequency range.

Figure 2:
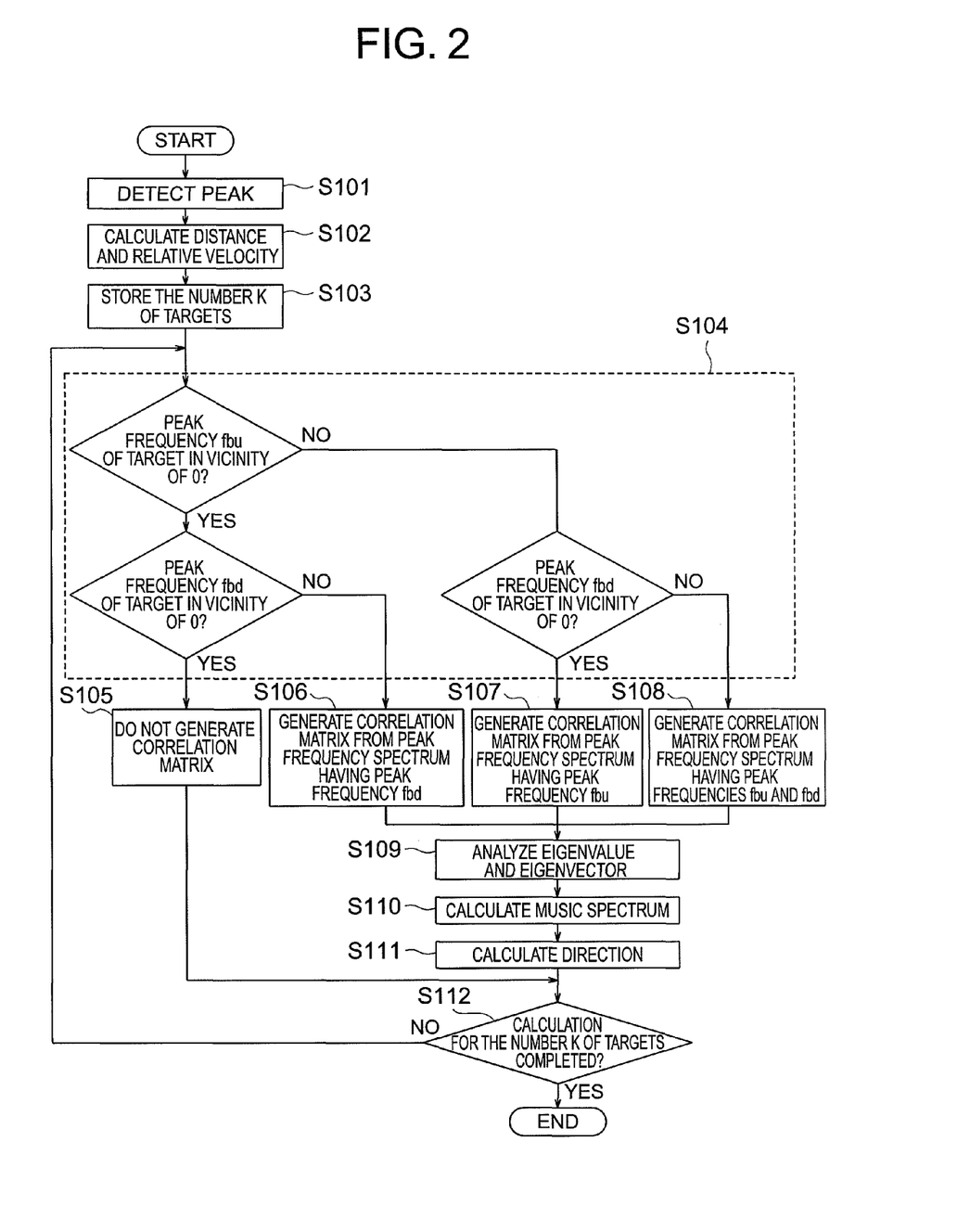
FIG. 2 is a flowchart illustrating an operation of a target detection unit of the radar device according to the first embodiment of the present invention.
Figure 4A:
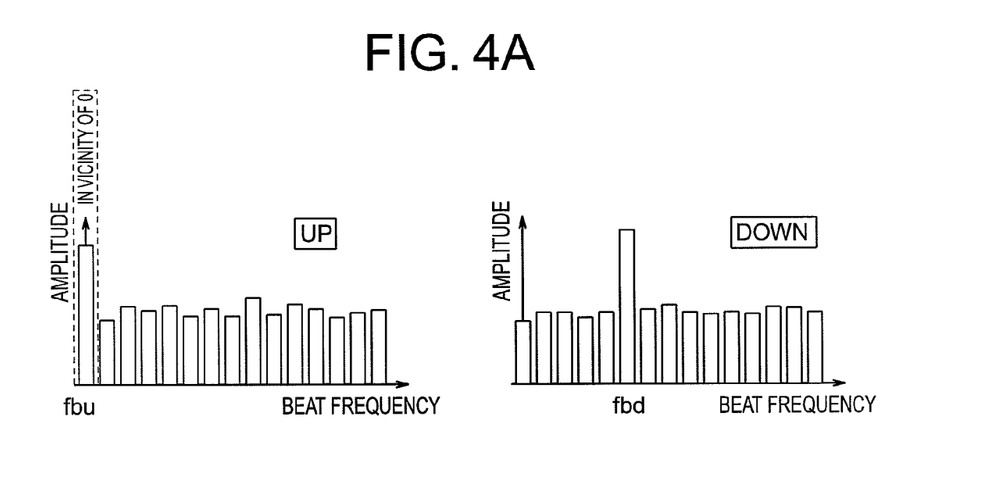
FIGS. 4A and 4B are diagrams illustrating the amplitude of the complex spectrum in each of modulation periods of a channel of the radar device according to the first embodiment of the present invention.
Figure 4B:
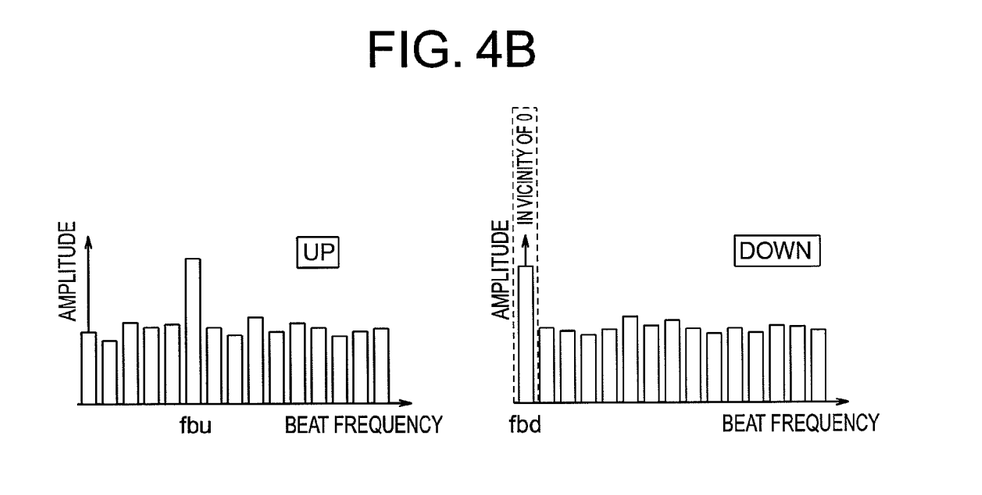
Figure 5:
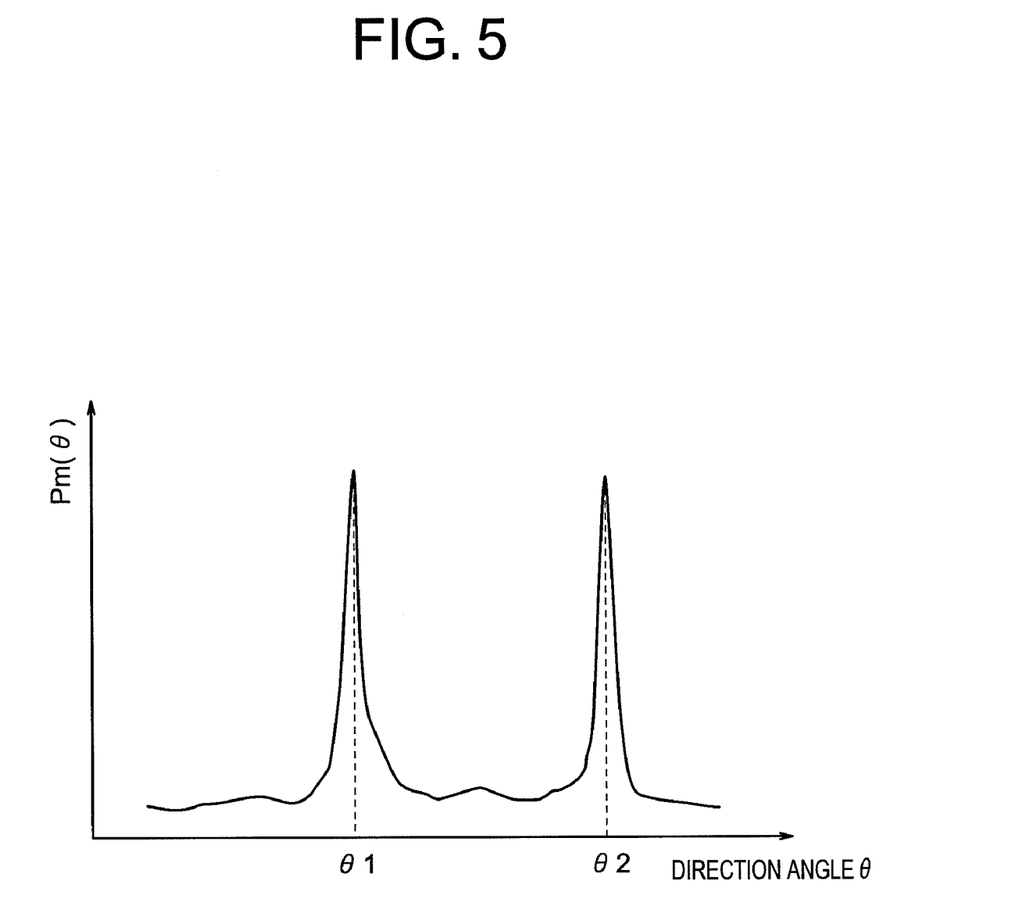
FIG. 5 is a diagram illustrating a MUSIC spectrum of the radar device according to the first embodiment of the present invention.

Next, the specific operation of the target detection unit 1 is described with reference to FIGS. 2 to 5. FIG. 2 is a flowchart illustrating the operation of the target detection unit in the radar device according to the first embodiment of the present invention. FIGS. 3A to 3F are diagrams illustrating the amplitude of a complex spectrum in each of channels and in each of modulation periods of the radar device according to the first embodiment of the present invention. FIGS. 4A and 4B are diagrams illustrating the amplitude of the complex spectrum in each of the modulation periods of the channel of the radar device according to the first embodiment of the present invention. FIG. 5 is a diagram illustrating a MUSIC spectrum of the radar device according to the first embodiment of the present invention.

First, in Step S101 of FIG. 2, the peak detection unit 30 detects peaks with respect to the amplitudes of beat frequency spectra for six channels. More specifically, as illustrated in FIGS. 3A to 3F, the peak detection unit 30 provides a detection threshold value for the amplitude of the beat frequency spectra for six channels, and determines that an amplitude that is equal to or larger than the detection threshold value and also larger than the amplitudes of adjacent beat frequencies is a peak.

Figure 3A:
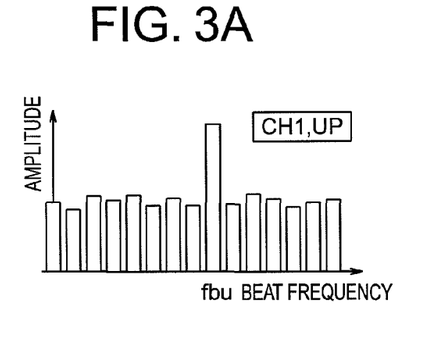
FIGS. 3A to 3F are diagrams illustrating an amplitude of a complex spectrum in each of channels and in each of modulation periods of the radar device according to the first embodiment of the present invention.
Figure 3B:
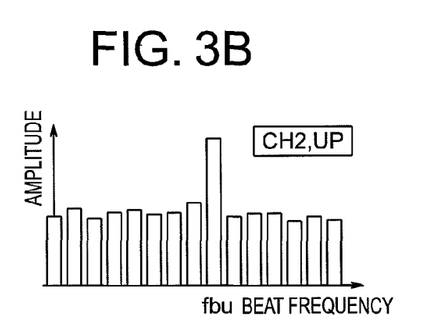
Figure 3C:
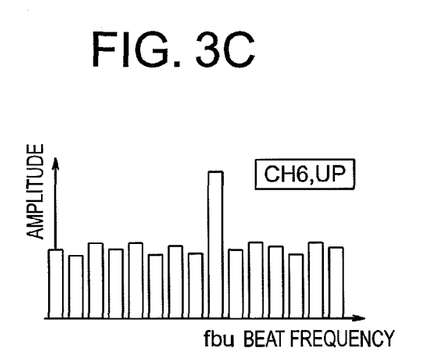
Figure 3D:
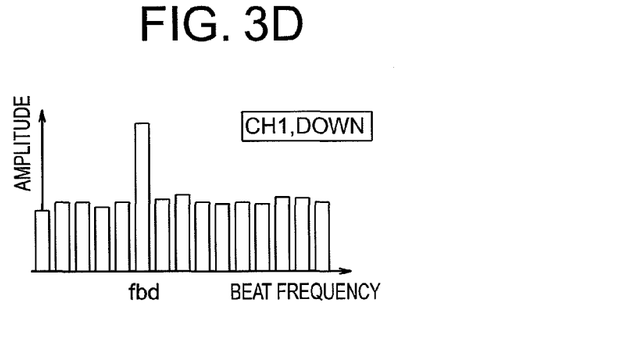
Figure 3E:
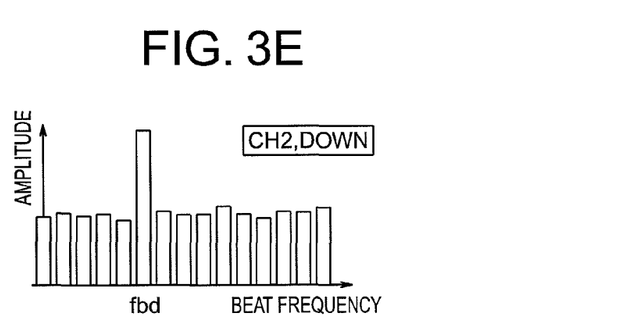
Figure 3F:
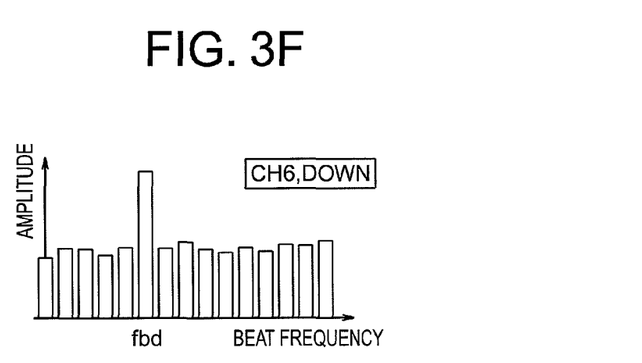

FIGS. 3A to 3F illustrate processing of Step S101, and illustrate the amplitudes of the input beat frequency spectra for six channels. In FIGS. 3A to 3F, FIGS. 3A to 3C illustrate the amplitudes of the beat frequency spectra for six channels at an up-time, and FIGS. 3D to 3F illustrate the amplitudes of the beat frequency spectra for six channels at a down-time. In the respective figures, the axis of abscissa represents a beat frequency, and the axis of ordinate represents the amplitude. Further, a peak frequency of the amplitude being a peak is indicated by "fbu" in the up-period, and indicated by "fbd" in the down-period.

Subsequently, in Step S102, the distance/relative velocity calculation unit 31 calculates the distance R and the relative velocity V of the target 40 from the peak frequencies fbu and fbd obtained in Step S101 on the basis of the principle of the general frequency modulation continuous wave (FM-CW) radar. That is, the distance R is calculated through the following Expression (1).

(Ex. 1)
$$R = \frac{cT}{4f_m}(f_{bu} + f_{bd}) \tag{1}$$

Further, the relative velocity V is calculated through the following Expression (2).

(Ex. 2)
$$V = \frac{c}{4f_c}(f_{bu} - f_{bd}) \tag{2}$$

In Expressions (1) and (2), c is the light speed, T is one modulation time, fm is a frequency modulation width, and fc is a carrier wave frequency. Further, fbu is the peak frequency in the up-period, and fbd is the peak frequency in the down-period.

Subsequently, in Step S103, the distance/relative velocity calculation unit 31 counts a number K of calculated targets 40, and stores the number K therein.

Then, in Step S104, the direction calculation unit 32 determines whether or not the peak frequencies fbu and fbd of the target 40 fall within a given frequency range (for example, in the vicinity of 0).

That is, the process proceeds to Step S105 when both of the peak frequencies fbu and fbd are in the vicinity of 0. The process proceeds to Step S106 when the peak frequency fbu is in the vicinity of 0 as illustrated in FIG. 4A. The process proceeds to Step S107 when the peak frequency fbd is in the vicinity of 0 as illustrated in FIG. 4B. The process proceeds to Step S108 when both of the peak frequencies fbu and fbd are out of the vicinity of 0.

In Step S105, the direction calculation unit 32 does not generate a correlation matrix Rc because both of the peak frequencies fbu and fbd are in the vicinity of 0 so that therefore there exists no target satisfying the distance R=0 and the relative velocity V=0, and the process proceeds to Step S112.

In Step S106, the direction calculation unit 32 generates the correlation matrix Rc for use in the MUSIC method. The peak frequency fbu is in the vicinity of 0, and hence the direction calculation unit 32 prohibits addition of the correlation matrix generated from the beat frequency spectrum having a peak frequency fbu by means of the correlation matrix addition prohibition unit 33, and the correlation matrix Rc is represented by the following Expression (3) in orders of 6×6. Then, the process proceeds to Step S109.

(Ex. 3)
$$R_c = \begin{bmatrix} Y_1 \cdot Y_1^* & Y_1 \cdot Y_2^* & \ldots & Y_1 \cdot Y_6^* \\ Y_2 \cdot Y_1^* & Y_2 \cdot Y_2^* & \ldots & Y_2 \cdot Y_6^* \\ \vdots & \vdots & \ddots & \vdots \\ Y_6 \cdot Y_1^* & Y_6 \cdot Y_2^* & \ldots & Y_6 \cdot Y_6^* \end{bmatrix} \quad (3)$$

In Expression (3), $Y_i$ is a beat frequency spectrum of the peak frequency fbd in an i-th (i=1, . . . , 6) channel (CHi). Further, $Y_i^*$ represents a complex conjugate of $Y_i$.

In Step S107, the direction calculation unit 32 generates the correlation matrix Rc for use in the MUSIC method. The peak frequency fbd is in the vicinity of 0, and hence the direction calculation unit 32 prohibits addition of the correlation matrix generated from the beat frequency spectrum having a peak frequency fbd by means of the correlation matrix addition prohibition unit 33, and the correlation matrix Rc is represented by the following Expression (4) in orders of 6×6. Then, the process proceeds to Step S109.

(Ex. 4)
$$R_c = \begin{bmatrix} X_1 \cdot X_1^* & X_1 \cdot X_2^* & \ldots & X_1 \cdot X_6^* \\ X_2 \cdot X_1^* & X_2 \cdot X_2^* & \ldots & X_2 \cdot X_6^* \\ \vdots & \vdots & \ddots & \vdots \\ X_6 \cdot X_1^* & X_6 \cdot X_2^* & \ldots & X_6 \cdot X_6^* \end{bmatrix} \quad (4)$$

In Expression (4), $X_i$ is a beat frequency spectrum of the peak frequency fbu in an i-th (i=1, . . . , 6) channel (CHi). Further, $X_i^*$ represents a complex conjugate of $X_i$.

In Step S108, the direction calculation unit 32 generates the correlation matrix Rc for use in the MUSIC method. Both of the peak frequencies fbu and fbd are out of the vicinity of 0, and hence the correlation matrix Rc is represented by the following Expression (5) in orders of 6×6. Then, the process proceeds to Step S109.

(Ex. 5)
$$R_c = \begin{bmatrix} X_1 \cdot X_1^* & X_1 \cdot X_2^* & \ldots & X_1 \cdot X_6^* \\ X_2 \cdot X_1^* & X_2 \cdot X_2^* & \ldots & X_2 \cdot X_6^* \\ \vdots & \vdots & \ddots & \vdots \\ X_6 \cdot X_1^* & X_6 \cdot X_2^* & \ldots & X_6 \cdot X_6^* \end{bmatrix} + \begin{bmatrix} Y_1 \cdot Y_1^* & Y_1 \cdot Y_2^* & \ldots & Y_1 \cdot Y_6^* \\ Y_2 \cdot Y_1^* & Y_2 \cdot Y_2^* & \ldots & Y_2 \cdot Y_6^* \\ \vdots & \vdots & \ddots & \vdots \\ Y_6 \cdot Y_1^* & Y_6 \cdot Y_2^* & \ldots & Y_6 \cdot Y_6^* \end{bmatrix} \quad (5)$$

In Expression (5), $X_i$ is a beat frequency spectrum of the peak frequency fbu in an i-th (i=1, . . . , 6) channel (CHi), and $Y_i$ is a beat frequency spectrum of the peak frequency fbd in an i-th (i=1, . . . , 6) channel (CHi). Further, $X_i^*$ represents a complex conjugate of $X_i$, and $Y_i^*$ represents a complex conjugate of $Y_i$.

Subsequently, in Step S109, the direction calculation unit 32 analyzes an eigenvalue and an eigenvector with respect to the correlation matrix Rc to obtain eigenvalues $\Lambda_1$ to $\Lambda_6$ and eigenvectors $e_1$ to $e_6$ corresponding to the respective eigenvalues.

Subsequently, in Step S110, the direction calculation unit 32 calculates an angle spectrum Pm(θ) (MUSIC spectrum) through the following Expression (6) on the basis of the general MUSIC method by using the eigenvalues $\Lambda_1$ to $\Lambda_6$ and the eigenvectors $e_1$ to $e_6$.

(Ex. 6)
$$P_m(\theta) = \frac{\|a(\theta)\|^2}{\sum_{i=L+1}^{6} |e_i^H a(\theta)|^2}, \quad (6)$$

$$a(\theta) = \begin{bmatrix} 1 \\ \exp(j\Delta\phi) \\ \exp(j2\Delta\phi) \\ \exp(j3\Delta\phi) \\ \exp(j4\Delta\phi) \\ \exp(j5\Delta\phi) \end{bmatrix},$$

$$\Delta\phi = 2\pi \frac{d}{\lambda}\sin\theta$$

In Expression (6), $e_i^H$ is a complex conjugate transpose of the eigenvector $e_i$, L is the number of incident signals, λ is a wavelength, and d is an element interval of the receiving antennas 6 to 11.

Subsequently, in Step S111, the direction calculation unit 32 extracts the direction θ in which the MUSIC spectrum becomes peak.

More specifically, when the MUSIC spectrum in a subject direction is larger than the MUSIC spectrum in the adjacent directions, the direction calculation unit 32 calculates that direction as a peak direction. FIG. 5 is a diagram illustrating processing of Step S111, and illustrates an example of the MUSIC spectrum.

Of the peak directions thus extracted, the directions having a larger MUSIC spectrum are assumed to be the directions θ of the targets 40 in order. In the example of FIG. 5, θ1 and θ2 are calculated as the directions θ of two targets.

Steps S105 to S111 are basic processing of the MUSIC method, which have been already published in various known documents, and therefore their detailed description is omitted.

Finally, the target detection unit 1 determines in Step S112 whether or not the calculation for the number K of targets counted in Step S103 has been completed. When the target detection unit 1 determines that the calculation has not been completed (that is, NO), the target detection unit 1 returns to Step S104, and repetitively executes the processing of Steps S104 to S111.

On the other hand, when the target detection unit 1 determines in Step S112 that the calculation for the number of targets has been completed (that is, YES), the target detection unit 1 outputs the distances R, the relative velocities V, or the directions θ of all of the targets 40 as the target information to an external device (not shown).

As described above, according to the first embodiment of the present invention, the direction calculation unit 32 does not add the correlation matrix generated from the peak frequency spectrum having a peak frequency in the vicinity of 0. Accordingly, the direction calculation unit 32 can accurately calculate the directions and the number of targets without being affected by a signal in which a noise generated by a transceiver or an A/D converter, or an offset voltage caused by the variation or the temperature characteristics is superimposed on the received signal.

Second Embodiment

A radar device according to a second embodiment of the present invention is described with reference to FIGS. 6 and 7A to 7C. The configuration of the radar device according to the second embodiment of the present invention is identical with that of the first embodiment.

In the first embodiment, addition of the correlation matrix is prohibited when the peak frequencies fbu and fbd are in the vicinity of 0. On the other hand, in the second embodiment, addition of the correlation matrix is prohibited when the peak frequencies fbu and fbd fall within the frequency range in which a stopping target exists.

Figure 6:
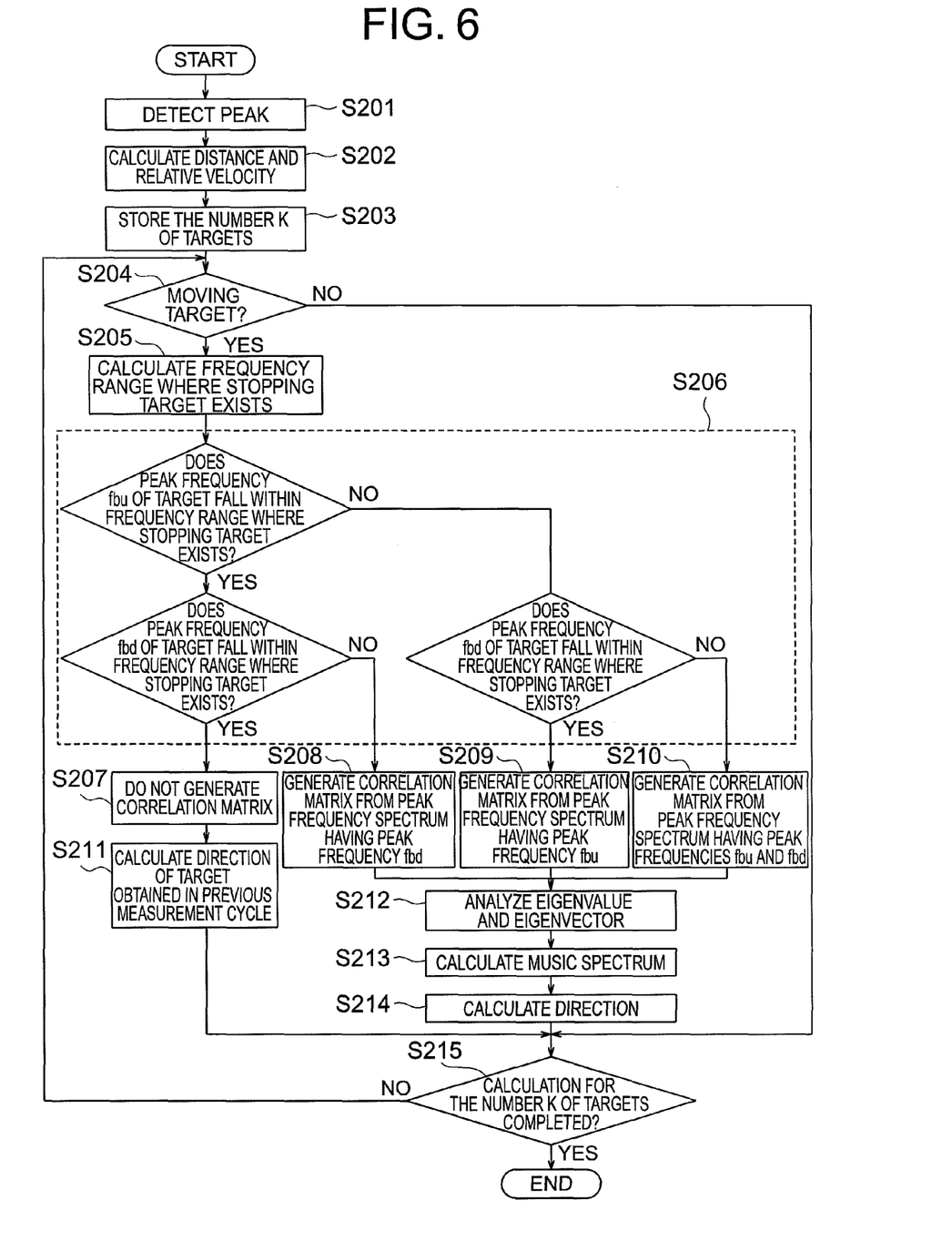
FIG. 6 is a flowchart illustrating an operation of a target detection unit of a radar device according to a second embodiment of the present invention.
Figure 7A:
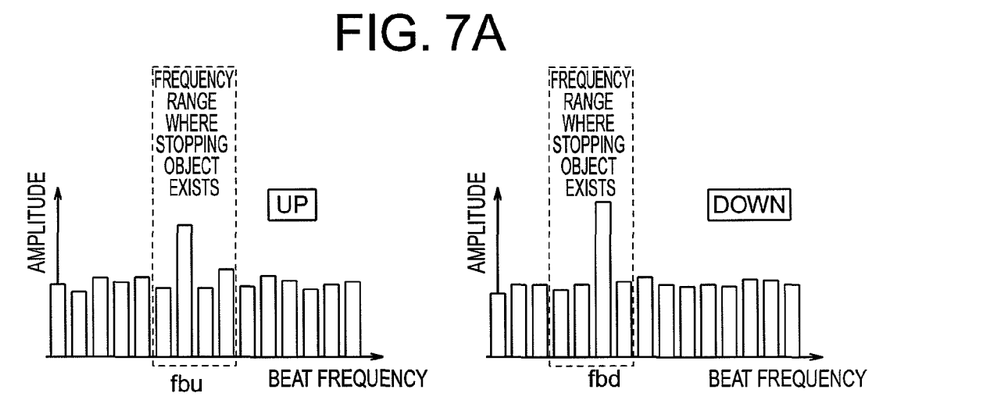
FIGS. 7A to 7C are diagrams illustrating an amplitude of a complex spectrum in each of modulation periods of a channel of the radar device according to the second embodiment of the present invention.
Figure 7B:
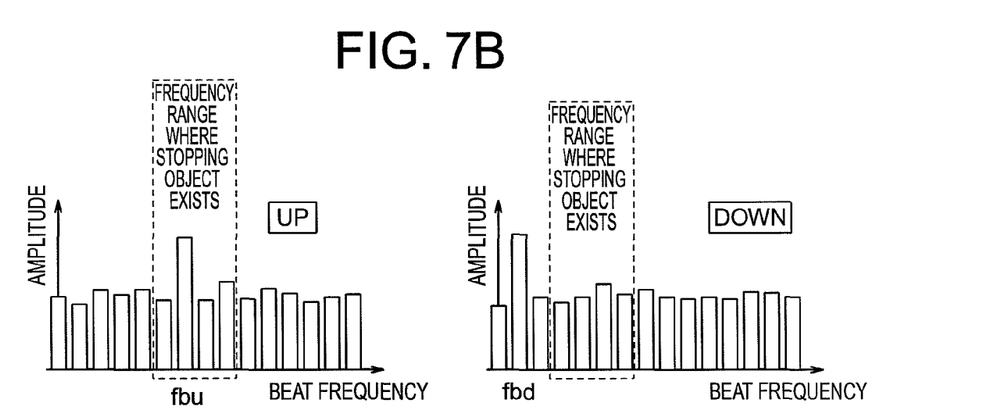
Figure 7C:
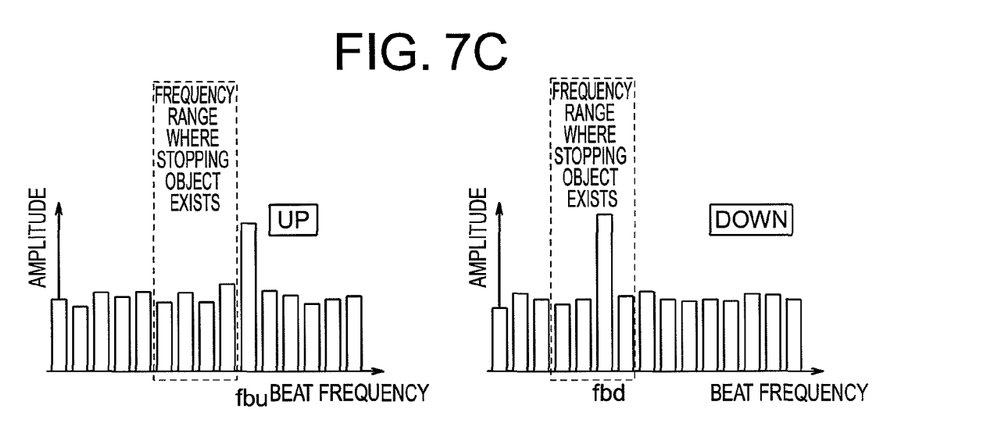

Next, the operation of the radar device according to the second embodiment of the present invention is described with reference to the accompanying drawings. FIG. 6 is a flowchart illustrating the operation of a target detection unit of the radar device according to the second embodiment of the present invention. FIGS. 7A to 7C are diagrams illustrating the amplitude of a complex spectrum in each of modulation periods of a channel of the radar device according to the second embodiment of the present invention.

The specific operation of the target detection unit 1 is described below. In the flowchart of FIG. 6, processing is partially common to that of the flowchart of FIG. 2. For that reason, description of the same processing is omitted.

Steps S201 to S203 are identical with Steps S101 to S103 of FIG. 2, and their description is omitted.

Then, in Step S204, the direction calculation unit 32 determines whether or not the target 40 is a moving target. When the target 40 is the moving target, the process proceeds to subsequent Step S205, and when the target 40 is not the moving target, the process proceeds to Step S215.

Subsequently, in Step S205, the direction calculation unit 32 calculates a frequency range in which the stopping target exists. That is, with the use of an FM-pulse Doppler system as the radar system, the direction calculation unit 32 calculates the frequency range calculated according to a subject vehicle velocity and a range gate width for each of range gates as the frequency range in which the stopping target exists.

Subsequently, in Step S206, the direction calculation unit 32 determines whether or not the peak frequencies fbu and fbd fall within the frequency range in which the stopping target exists.

That is, as illustrated in FIG. 7A, when both of the peak frequencies fbu and fbd fall within the frequency range in which the stopping target exists, the process proceeds to Step S207. As illustrated in FIG. 7B, when the peak frequency fbu falls within the frequency range in which the stopping target exists, the process proceeds to Step S208. As illustrated in FIG. 7C, when the peak frequency fbd falls within the frequency range in which the stopping target exists, the process proceeds to Step S209. When both of the peak frequencies fbu and fbd are outside of the frequency range in which the stopping target exists, the process proceeds to Step S210.

In Step S207, the direction calculation unit 32 does not generate the correlation matrix Rc because both of the peak frequencies fbu and fbd fall within the frequency range in which the stopping target exists, and the process proceeds to Step S211.

In Step S211, the direction calculation unit 32 calculates a direction of a target obtained in the previous measurement cycle, and the process proceeds to Step S215.

Steps S208 to S215 are identical with Steps S106 to S112, and their description is omitted.

As described above, the target detection unit 1 outputs the distances R, the relative velocities V, or the directions θ of all the targets 40 to the external device (not shown) as target information.

As described above, according to the second embodiment of the present invention, the direction calculation unit 32 does not add the correlation matrix generated from the peak frequency spectrum having a peak frequency within the frequency range in which the stopping target exists. Accordingly, the direction calculation unit 32 can accurately calculate the directions and the number of moving targets without being affected by the signal in which the reflection signal from the stopping target is superimposed on the received signal.

Third Embodiment

Figure 8:
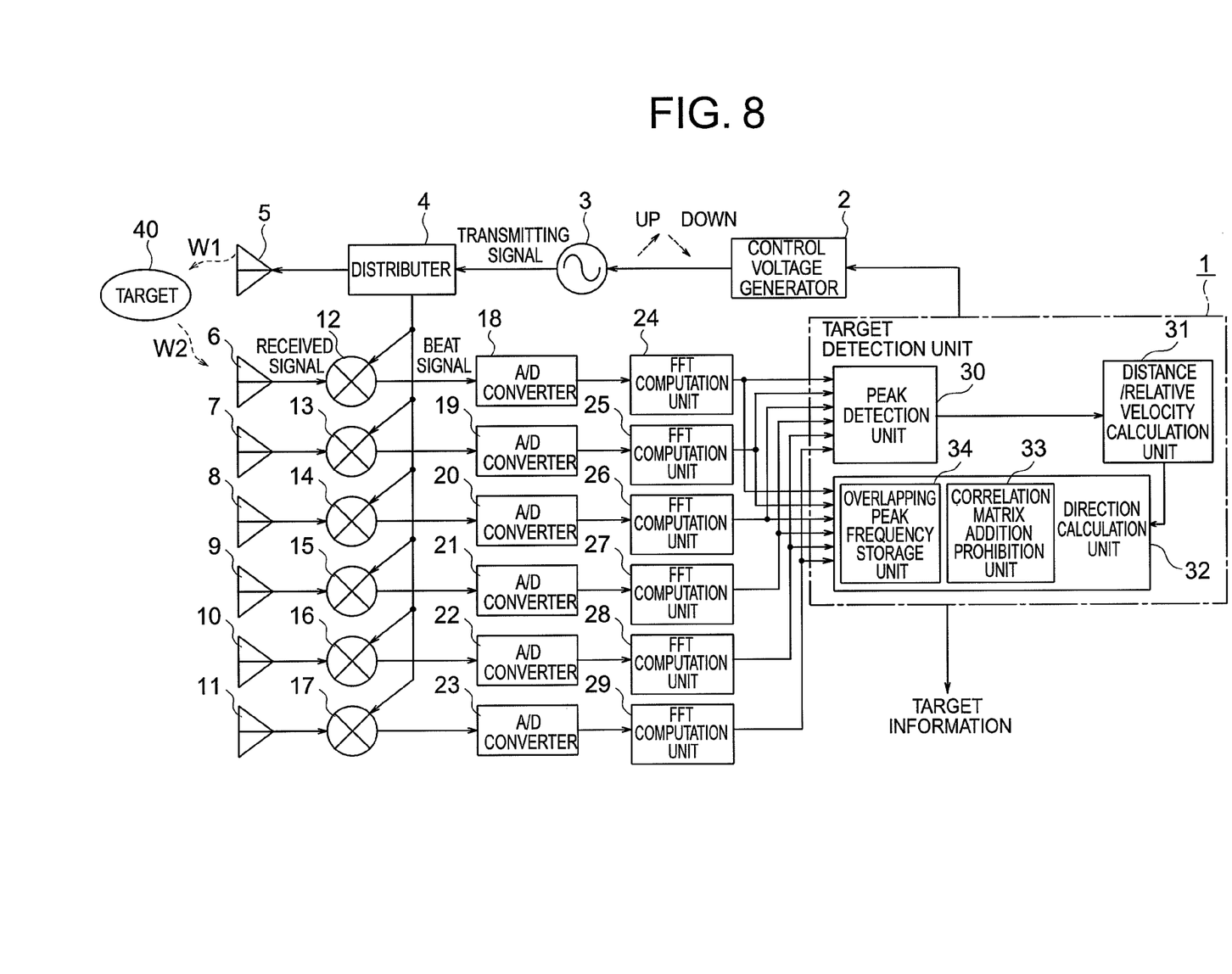
FIG. 8 is a diagram illustrating a configuration of a radar device according to a third embodiment of the present invention.

A radar device according to a third embodiment of the present invention is described with reference to FIGS. 8 to 10. FIG. 8 is a diagram illustrating the configuration of a radar device according to the third embodiment of the present invention.

In the third embodiment, with the configuration illustrated in FIG. 8, when a difference between an up-period peak frequency fbu_a of a target a (a=1, . . . , K−1: K≧2) and an up-period peak frequency fbu_b of a target b (b=a+1, . . . , K: K≧2) falls within a given frequency range, the direction calculation unit 32 stores the overlapping peak frequency fbu_a of the target a and the overlapping peak frequency fbu_b of the target b in an overlapping peak frequency storage unit 34.

Alternatively, when a difference between a down-period peak frequency fbd_a of the target a (a=1, . . . , K−1) and a down-period peak frequency fbd_b of the target b (b=a+1, . . . , K) falls within a given frequency range, the direction calculation unit 32 stores the overlapping peak frequency fbd_a of the target a and the overlapping peak frequency fbd_b of the target b in the overlapping peak frequency storage unit 34.

Then, when the overlapping peak frequency is stored in the target k (k=1, . . . , K: K≧2), the direction calculation unit 32 prohibits addition of the correlation matrix generated from the peak frequency spectrum of the overlapping peak frequency by means of the correlation matrix addition prohibition unit 33, and calculates a direction of a target on the basis of the correlation matrix generated from the peak frequency spectrum which is different from the overlapping peak frequency.

Next, the specific operation of the direction calculation unit 32 is described with reference to FIGS. 9 and 10. FIG. 9 is a flowchart illustrating the operation of a target detection unit of the radar device according to the third embodiment of the present invention. FIGS. 10A and 10B are a diagram illustrating the amplitude of a complex spectrum at a time of target overlap in the radar device according to the third embodiment of the present invention.

Figure 9:
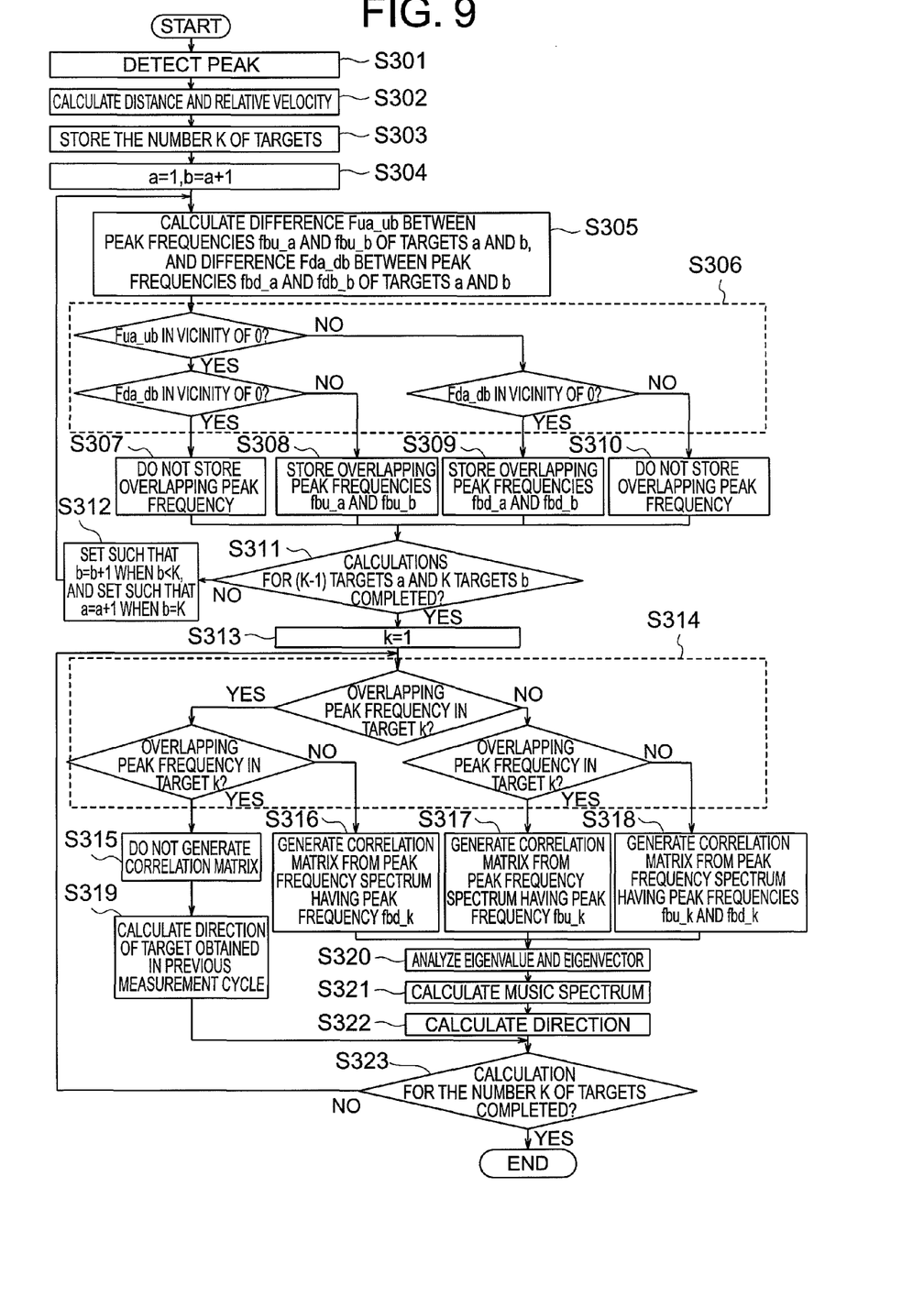
FIG. 9 is a flowchart illustrating an operation of a target detection unit of the radar device according to the third embodiment of the present invention.

In the flowchart of FIG. 9, processing is partially common to that of the flowchart of FIG. 2. For that reason, description of the same processing is omitted.

In the flowchart of FIG. 9, processing different from the flowchart of FIG. 2 is processing of Steps S304 to S319, and its contents is described in detail.

Steps S301 to S303 are identical with Steps S101 to S103 of FIG. 2, and their description is omitted.

Then, in Step S304, the direction calculation unit 32 assumes that a target No. a is 1, and a target No. b is a+1.

Subsequently, in Step S305, the direction calculation unit 32 calculates, when the number of targets is K (K≧2), a difference Fua_ub between an up-period peak frequency fbu_a of the target a (a=1, . . . , K−1) and an up-period peak frequency fbu_b of the target b (b=a+1, . . . , K), and a difference Fda_db between a down-period peak frequency fbd_a of the target a and a down-period peak frequency fbd_b of the target b, through the following Expression (7).

(Ex. 7)

$$F_{ua\_ub} = f_{bu\_a} - f_{bu\_b}$$

$$F_{da\_db} = f_{bd\_a} - f_{bd\_b} \quad (7)$$

Then, in Step S306, the direction calculation unit 32 determines whether or not any one of the differences Fua_ub and Fda_db falls within a given frequency range (for example, in the vicinity of 0).

That is, the process proceeds to Step S307 when both of the differences Fua_ub and Fda_db are in the vicinity of 0. The process proceeds to Step S308 when only the difference Fua_ub is in the vicinity of 0. The process proceeds to Step S309 when only the difference Fda_db is in the vicinity of 0. The process proceeds to Step S310 when both of the differences Fua_ub and Fda_db are out of the vicinity of 0.

In Step S307, the direction calculation unit 32 determines that the peak frequencies do not overlap with each other because the distances and the relative velocities of the target a and the target b coincide with each other. Then, the direction calculation unit 32 does not store the overlapping peak frequency.

Figure 10A:
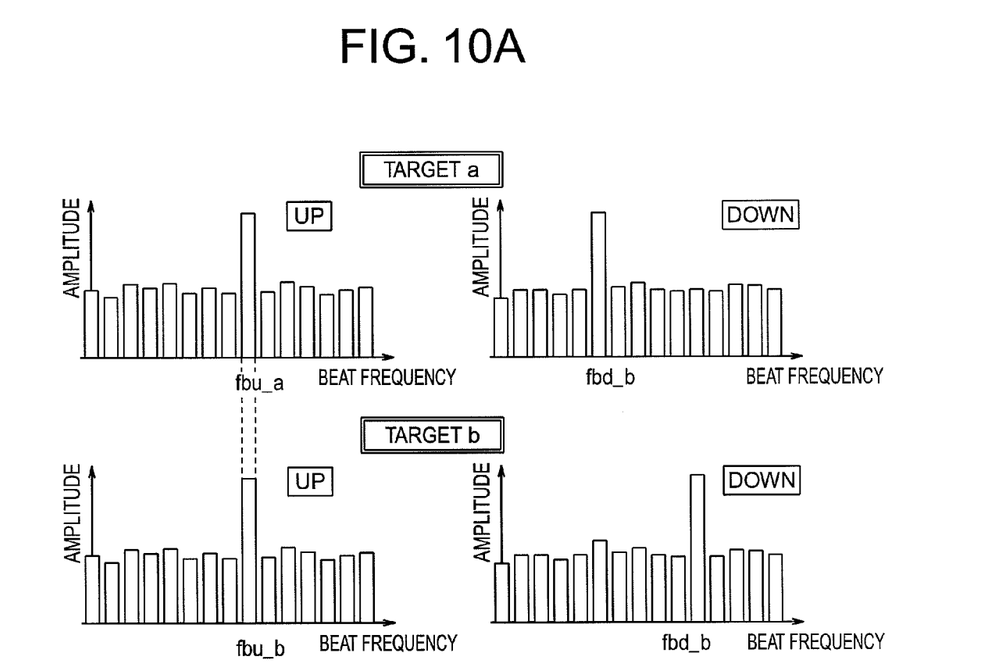
FIGS. 10A and 10B are a diagram illustrating an amplitude of a complex spectrum at a time of target overlap in the radar device according to the third embodiment of the present invention.

In Step S308, as illustrated in FIG. 10A, the direction calculation unit 32 determines that the peak frequency fbu_a of the target a and the peak frequency fbu_b of the target b overlap with each other, and stores the overlapping peak frequency fbu_a of the target a and the overlapping peak frequency fbu_b of the target b in the overlapping peak frequency storage unit 34.

Figure 10B:
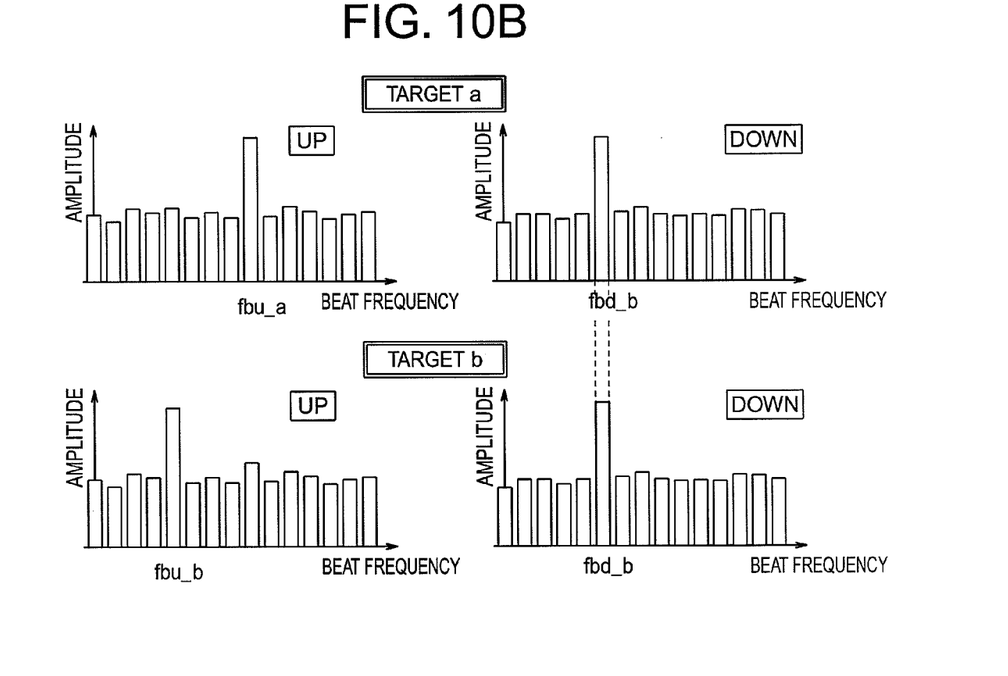

In Step S309, as illustrated in FIG. 10B, the direction calculation unit 32 determines that the peak frequency fbd_a of the target a and the peak frequency fbd_b of the target b overlap with each other, and stores the overlapping peak frequency fbd_a of the target a and the overlapping peak frequency fbd_b of the target b in the overlapping peak frequency storage unit 34.

In Step S310, the direction calculation unit 32 determines that the peak frequencies of the target a and the target b do not overlap each other, and does not store the overlapping peak frequency.

Subsequently, in Step S311, the direction calculation unit 32 determines whether or not calculations for (K−1) targets a and K targets b have been completed. When the calculation has not been completed (that is, NO), the process proceeds to Step S312, and when the calculation has been completed (that is, YES), the process proceeds to Step S313.

Then, in Step S312, the direction calculation unit 32 assumes that b is b+1 when b<K, and a is a+1 and b is a+1 when b=K, and returns to Step S305 to repetitively execute the processing of Steps S305 to S301.

In Step S313, the direction calculation unit 32 sets a target No. k to 1.

Subsequently, in Step S314, the direction calculation unit 32 determines whether or not the overlapping peak frequency is stored in the target k (k=1, . . . , K) having an up-period peak frequency being fbu_k and a down-period peak frequency being fbd_k.

That is, the process proceeds to Step S315 when the overlapping peak frequencies fbu_k and fbd_k are stored in the target k. The process proceeds to Step S316 when the overlapping peak frequency fbu_k is stored in the target k. The process proceeds to Step S317 when the overlapping peak frequency fbd_k is stored in the target k. The process proceeds to Step S318 when no overlapping peak frequency is stored.

The direction calculation unit 32 stores the overlapping peak frequencies fbu_k and fbd_k in the target k, and hence, in Step S315, the direction calculation unit 32 does not generate the correlation matrix Rc, and the process proceeds to Step S319.

In Step S316, the direction calculation unit 32 generates a correlation matrix Rkc of the target k (k=1, . . . , K) for use in the MUSIC method, and the process proceeds to Step S320. The direction calculation unit 32 prohibits addition of the correlation matrix generated from the beat frequency spectrum having a peak frequency fbu_k by means of the correlation matrix addition prohibition unit 33, and the correlation matrix Rkc is represented by the following Expression (8) in orders of 6×6.

(Ex. 8)

$$R_{kc} = \begin{bmatrix} Y_{k1} \cdot Y_{k1}^* & Y_{k1} \cdot Y_{k2}^* & \ldots & Y_{k1} \cdot Y_{k6}^* \\ Y_{k2} \cdot Y_{k1}^* & Y_{k2} \cdot Y_{k2}^* & \ldots & Y_{k2} \cdot Y_{k6}^* \\ \vdots & \vdots & \ddots & \vdots \\ Y_{k6} \cdot Y_{k1}^* & Y_{k6} \cdot Y_{k2}^* & \ldots & Y_{k6} \cdot Y_{k6}^* \end{bmatrix} \quad (8)$$

In Expression (8), $Y_{ki}$ is a beat frequency spectrum of the peak frequency fbd_k of the target k in an i-th (i=1, . . . , 6) channel (CHi). Further, $Y_{ki}^*$ represents a complex conjugate of $Y_{ki}$.

In Step S317, the direction calculation unit 32 generates the correlation matrix Rkc of the target k (k=1, . . . , K) for use in the MUSIC method, and the process proceeds to Step S320. The direction calculation unit 32 prohibits addition of the correlation matrix generated from the beat frequency spectrum having a peak frequency fbd_k by means of the correlation matrix addition prohibition unit 33, and the correlation matrix Rkc is represented by the following Expression (9) in orders of 6×6.

(Ex. 9)

$$R_{kc} = \begin{bmatrix} X_{k1} \cdot X_{k1}^* & X_{k1} \cdot X_{k2}^* & \ldots & X_{k1} \cdot X_{k6}^* \\ X_{k2} \cdot X_{k1}^* & X_{k2} \cdot X_{k2}^* & \ldots & X_{k2} \cdot X_{k6}^* \\ \vdots & \vdots & \ddots & \vdots \\ X_{k6} \cdot X_{k1}^* & X_{k6} \cdot X_{k2}^* & \ldots & X_{k6} \cdot X_{k6}^* \end{bmatrix} \quad (9)$$

In Expression (9), $X_{ki}$ is a beat frequency spectrum of the peak frequency fbu_k of the target k in an i-th (i=1, . . . , 6) channel (CHi). Further, $X_{ki}^*$ represents a complex conjugate of $X_{ki}$.

In Step S318, the direction calculation unit 32 generates the correlation matrix Rkc of the target k (k=1, . . . , K) for use in the MUSIC method, and the process proceeds to Step S320. The correlation matrix Rkc is represented by the following Expression (10) in orders of 6×6.

(Ex. 10)

$$R_{kc} = \begin{bmatrix} X_{k1} \cdot X_{k1}^* & X_{k1} \cdot X_{k2}^* & \cdots & X_{k1} \cdot X_{k6}^* \\ X_{k2} \cdot X_{k1}^* & X_{k2} \cdot X_{k2}^* & \cdots & X_{k2} \cdot X_{k6}^* \\ \vdots & \vdots & \ddots & \vdots \\ X_{k6} \cdot X_{k1}^* & X_{k6} \cdot X_{k2}^* & \cdots & X_{k6} \cdot X_{k6}^* \end{bmatrix} + \\ \begin{bmatrix} Y_{k1} \cdot Y_{k1}^* & Y_{k1} \cdot Y_{k2}^* & \cdots & Y_{k1} \cdot Y_{k6}^* \\ Y_{k2} \cdot Y_{k1}^* & Y_{k2} \cdot Y_{k2}^* & \cdots & Y_{k2} \cdot Y_{k6}^* \\ \vdots & \vdots & \ddots & \vdots \\ Y_{k6} \cdot Y_{k1}^* & Y_{k6} \cdot Y_{k2}^* & \cdots & Y_{k6} \cdot Y_{k6}^* \end{bmatrix} \quad (10)$$

In Expression (10), $X_{ki}$ is a beat frequency spectrum of the peak frequency fbu_k of the target k in an i-th (i=1, . . . , 6) channel (CHi), and $Y_{ki}$ is a beat frequency spectrum of the peak frequency fbd_k of the target k in an i-th (i=1, . . . , 6) channel (CHi). Further, $X_{ki}^*$ represents a complex conjugate of $X_{ki}$, and $Y_{ki}^*$ represents a complex conjugate of $Y_{ki}$.

In Step S319, the direction calculation unit 32 calculates a direction of a target obtained in the previous measurement cycle, and the process proceeds to Step S323.

Steps S320 to S323 are identical with Steps S109 to S112 of FIG. 2, and their description is omitted.

As described above, the target detection unit 1 outputs the distances R, the relative velocities V, or the directions θ of all the targets 40 to an external device (not shown) as target information.

As described above, according to the third embodiment of the present invention, when the peak frequencies caused by a plurality of targets having different distances and different relative velocities overlap each other, the direction calculation unit 32 does not add the correlation matrix generated from the frequency spectrum of that peak frequency. As a result, the direction calculation unit 32 can accurately calculate the directions and the number of targets without being affected by the signal in which the phases of the reflection waves from the plurality of targets are combined together, respectively.

Further, in the first to third embodiments, the case where six receiving antennas 6 to 11 (refer to FIGS. 1 and 8) are used is exemplified. However, even if the different number of receiving antennas is used, the present invention is applicable likewise.

Further, the above-mentioned embodiments exemplify a case in which the MUSIC method is used for the processing of calculating the direction of the target 40 by means of the direction calculating unit 32. However, the present invention can be applied to the radar device using another method, for example, the super-resolution arrival direction estimating process such as a unitary MUSIC method, an ESPRIT method, or a unitary ESPRIT method. In particular, in the case of using the unitary method, only a real number portion of the correlation matrix needs to be used, and hence the amount of computation can be further reduced.

Further, the use of the FM-CW system is exemplified as a system of detecting the distance R to and the relative velocity V of the target 40. Alternatively, the present invention can also be applied to an FM-pulse Doppler system radar device in which the transmitting signal is sectioned into a pulse and modulated, and other radar system radar device. When the radar system is of the FM-pulse Doppler system, the frequency range in which the stopping object exists in the second embodiment can be calculated according to the subject vehicle velocity and the range gate width in each of the range gates.

What is claimed is:

1. A radar device, comprising:
transmitting means for transmitting a transmitting signal having a plurality of modulation periods;
receiving means for receiving a plurality of reflection signals resulting from reflection of the transmitting signal by a plurality of targets;
mixing means for mixing the transmitting signal with each of the plurality of received reflection signals received by the receiving means to obtain a plurality of beat signals;
frequency analyzing means for analyzing frequencies of each of the plurality of beat signals; and
a target detection unit that calculates a direction of a target based on a summed correlation matrix in which correlation matrices generated from peak frequency spectra having peak frequencies according to a plurality of frequency analyzing results obtained by the analyzing of the frequency analyzing means in the plurality of modulation periods that do not satisfy a given condition are summed together,
wherein the target detection unit includes a correlation matrix addition prohibition unit that prohibits addition of a correlation matrix generated from a peak frequency spectrum having a peak frequency that satisfies the given condition, when a peak frequency in the plurality of modulation periods satisfies the given condition.

2. A radar device according to claim 1, wherein the given condition is that the peak frequency in the plurality of modulation periods falls within a given frequency range.

3. A radar device according to claim 2, wherein, in the given frequency range, the peak frequency in the plurality of modulation periods is about 0 Hz.

4. A radar device according to claim 2, wherein, in the given frequency range, the peak frequency in the plurality of modulation periods falls within a frequency range in which a stopping target exists.

5. A radar device according to claim 4, wherein the frequency range in which the stopping target exists is a frequency range that is calculated according to a subject vehicle velocity and a range gate width in each of range gates with a radar system being an FM-pulse Doppler system.

6. A radar device according to claim 1, wherein the target detection unit calculates a direction of the target obtained in a previous measurement cycle when all of the peak frequencies in the plurality of modulation periods satisfy the given condition.

7. A radar device, comprising:
transmitting means for transmitting a transmitting signal having a plurality of modulation periods;
receiving means for receiving a plurality of reflection signals resulting from reflection of the transmitting signal by a target;
mixing means for mixing the transmitting signal with each of the plurality of received reflection signals received by the receiving means to obtain a plurality of beat signals;
frequency analyzing means for analyzing frequencies of each of the plurality of beat signals; and
a target detection unit that calculates a direction of a target based on a summed correlation matrix in which correlation matrices generated from peak frequency spectra having peak frequencies according to a plurality of frequency analyzing results obtained by the analyzing of the frequency analyzing means corresponding to a plurality of targets in the plurality of modulation periods that fail to satisfy a given condition are summed together, wherein the target detection unit includes a correlation matrix addition prohibition unit that prohibits addition of a correlation matrix generated from a peak frequency spectrum having a peak frequency that satisfies the given condition, when a peak frequency of the plurality of targets in the plurality of modulation periods satisfies the given condition.

8. A radar device according to claim 7, wherein the given condition is that a difference between a peak frequency fb_a of a target a (a=1, ..., K−1: K≧2) and a peak frequency fb_b of a target b (b=a+1, ..., K: K≧2) in the plurality of modulation periods falls within a given frequency range.

9. A radar device according to claim 7, wherein the given condition is that a difference between a peak frequency fb_a of a target a (a=1, ..., K−1: K≧2) and a peak frequency fb_b of a target b (b=a+1, ..., K: K≧2) in the plurality of modulation periods falls within a given frequency range, wherein the target detection unit further includes:

an overlapping peak frequency storage unit that stores an overlapping peak frequency fb_a of the target a and an overlapping peak frequency fb_b of the target b; and a correlation matrix addition prohibition unit that prohibits addition of a correlation matrix generated from a peak frequency spectrum of the overlapping peak frequency, when an overlapping peak frequency is stored in a target k (k=1, ..., K: K≧2), and wherein the target detection unit calculates a direction of the target k based on a summed correlation matrix generated from a peak frequency spectrum different from the overlapping peak frequency.

10. A radar device according to claim 9, wherein, in the given frequency range, the difference between the peak frequency fb_a of the target a and the peak frequency fb_b of the target b is about 0 Hz, and wherein the overlapping peak frequency storage unit stores the peak frequency fb_a of the target a and the peak frequency fb_b of the target b.

11. A radar device according to claim 7, wherein the target detection unit calculates a direction of the target obtained in a previous measurement cycle when all of the peak frequencies of the plurality of targets in the plurality of modulation periods satisfy the given condition.

* * * * *